United States Patent
Schnorbus et al.

(10) Patent No.: US 9,388,756 B2
(45) Date of Patent: Jul. 12, 2016

(54) CHARGING-PRESSURE-GUIDED CONTROL METHOD FOR AN INTERNAL COMBUSTION ENGINE

(75) Inventors: Thorsten Schnorbus, Aachen (DE); Joschka Schaub, Aachen (DE)

(73) Assignee: FEV GmbH, Aachen (DE)

( * ) Notice: Subject to any disclaimer, the term of this patent is extended or adjusted under 35 U.S.C. 154(b) by 526 days.

(21) Appl. No.: 13/991,252

(22) PCT Filed: Oct. 19, 2011

(86) PCT No.: PCT/EP2011/068217
§ 371 (c)(1),
(2), (4) Date: Jul. 23, 2013

(87) PCT Pub. No.: WO2012/072333
PCT Pub. Date: Jun. 7, 2012

(65) Prior Publication Data
US 2013/0311071 A1    Nov. 21, 2013

(30) Foreign Application Priority Data

Dec. 2, 2010    (DE) .......................... 10 2010 060 992

(51) Int. Cl.
| | |
|---|---|
| *F01N 3/00* | (2006.01) |
| *F02D 41/02* | (2006.01) |
| *F02D 41/00* | (2006.01) |
| *F02D 41/14* | (2006.01) |

(52) U.S. Cl.
CPC ........ *F02D 41/0235* (2013.01); *F02D 41/0007* (2013.01); *F02D 41/1406* (2013.01); *F02D 41/1467* (2013.01); *F02D 41/029* (2013.01); *Y02T 10/144* (2013.01)

(58) Field of Classification Search
USPC ........... 60/274, 276, 280, 285, 286, 295, 297, 60/311
See application file for complete search history.

(56) References Cited

U.S. PATENT DOCUMENTS

| | | | |
|---|---|---|---|
| 8,011,179 B2* | 9/2011 | Scaife | F01N 3/023 60/288 |
| 8,359,840 B2* | 1/2013 | Van Nieuwstadt | F01N 3/0231 60/274 |
| 8,387,384 B2* | 3/2013 | Quigley | F02M 35/1038 123/564 |
| 8,479,495 B2* | 7/2013 | Funk | F02D 41/029 60/286 |
| 8,527,185 B2* | 9/2013 | Barasa | F01N 3/0253 123/437 |
| 8,805,606 B2* | 8/2014 | Schaffeld | F02B 33/34 701/102 |
| 8,850,799 B2* | 10/2014 | Yano | B01D 53/9477 60/286 |
| 2005/0131620 A1 | 6/2005 | Bowyer | |
| 2006/0137346 A1 | 6/2006 | Stewart et al. | |

FOREIGN PATENT DOCUMENTS

| | | |
|---|---|---|
| DE | 19819445 A1 | 11/1999 |
| DE | 19926148 A1 | 12/2000 |

(Continued)

*Primary Examiner* — Binh Q Tran
(74) *Attorney, Agent, or Firm* — Dinsmore & Shohl LLP

(57) ABSTRACT

A method of controlling a charging pressure of an internal combustion engine having a particle filter for the treatment of exhaust gases, wherein the charging pressure is controlled to achieve a nominal charging pressure value and wherein the nominal charging pressure value is set as a function of operating parameters, wherein there is determined a first value for a charging pressure minimizing a fuel consumption, taking into account a direct influence of the charging pressure on the fuel consumption of an internal combustion engine; as well as an internal combustion engine having a particle filter for the treatment of exhaust gases, using such a control method.

10 Claims, 4 Drawing Sheets

(56) References Cited

FOREIGN PATENT DOCUMENTS

| DE | 102007013119 A1 | 9/2008 |
| JP | 2002317682 A | 10/2002 |
| JP | 2005083354 A | 3/2005 |
| JP | 2005516298 A | 6/2005 |
| JP | 2006017052 A | 1/2006 |
| JP | 2008525719 A | 7/2008 |

* cited by examiner

CHARGING-PRESSURE-GUIDED CONTROL METHOD FOR AN INTERNAL COMBUSTION ENGINE

CROSS-REFERENCE TO RELATED APPLICATIONS

This application is the U.S. national stage of PCT/EP2011/068217 filed Oct. 19, 2011, which claims priority of German Patent Application 10 2010 060 992.7 filed Dec. 2, 2010.

FIELD OF THE INVENTION

The invention relates to a method of controlling the charging pressure for an internal combustion engine having a device for the treatment of exhaust gases, more particularly a particle filter and/or a nitrogen oxide catalyst, wherein the charging pressure is controlled to achieve a nominal charging pressure value and wherein the nominal charging pressure is set as a function of operating parameters, wherein there is determined a first value for a charging pressure minimising a fuel consumption, taking into account a direct influence of the charging pressure on the fuel consumption of the internal combustion engine, as well as an internal combustion engine having a particle filter for the treatment of exhaust gases wherein such a control method is used.

BACKGROUND OF THE INVENTION

In internal combustion engines, turbo charging, in addition to increasing the charging pressure, also allows the charging pressure to be set essentially freely. As a rule, an increase in the charging pressure leads to a reduction in particle emissions as a result of the resulting change in the fuel-air ratio. A charging pressure control method for an exhaust gas turbo charger with adjustable turbine blades is described in DE 199 05 420 A1. Via at least one controller acting on the setting device, the charging pressure is set to a nominal charging pressure value, with the controller parameters being set via characteristic curves or characteristic maps as a function of operating parameters.

When controlling the charging pressure, it is frequently the main objective to set a consumption-optimum nominal value while observing all the emission value limits required by law. The disadvantage of setting the charging pressure according to the state of the art consists in that an additional fuel consumption caused by a regeneration of particle filters is not taken into account.

SUMMARY OF THE INVENTION

It is an object of the invention to optimise the fuel consumption of the entire system consisting of the internal combustion engine and the exhaust gases treatment system.

The objective is achieved by the subjects of the independent claims. The sub-claims deal with preferred embodiments and advantageous further embodiments.

In the case of the inventive method for controlling a charging pressure of an internal combustion engine having a device for the treatment of exhaust gases, the charging pressure is controlled by setting a nominal charging pressure value, wherein the nominal charging pressure value is set as a function of operating parameters. More particularly, the charging pressure is controlled via a turbo charging mechanism which compresses the sucked-in air and, optionally, recovered exhaust gases for the purpose of increasing the charging pressure prior to being fed into the internal combustion engine.

The exhaust gases treatment device preferably comprises a particle filter and/or a nitrogen oxide catalyst.

A change in the fuel/air ratio by changing the charging pressure influences the fuel consumption by the combustion process in the internal combustion engine. On the one hand, this influences the process efficiency of the high-pressure process and, on the other hand, an increase in the charging pressure leads to changed conditions during the charge exchange cycle in the engine, so that the low pressure process of the internal combustion engine is also influenced. Said influences affecting the high-pressure process and the low pressure process thus establish a direct connection between the charging pressure and a fuel consumption.

In accordance with the invention, there is determined a first value for a charging pressure minimising the fuel consumption, taking into account a direct influence of the charging pressure on the fuel consumption of the internal combustion engine. Under the influence affecting the fuel consumption of the internal combustion engine, the above-described influences affecting the high-pressure process and the charge exchange in the low-pressure process are combined. Thus, in a preferred embodiment, there is determined a first value for a charging pressure minimising the fuel consumption, taking into account a direct influence of the charging pressure on an efficiency value in the high-pressure process and on a charge exchange in the low-pressure process of the internal combustion engine.

Furthermore, it is proposed in accordance with the invention to determine a second value for a charging pressure minimising the fuel consumption, taking into account an indirect influence of the charging pressure on an interval-determined regeneration of the device for treating exhaust gases. A change in the charging pressure influences the particle emission by the internal combustion engine, with the particle emission being decisive for a regeneration frequency of the particle filter. Thus, the nominal charging pressure value also influences the length of the regeneration interval. The length of the regeneration interval, in turn, influences the fuel consumption because for each particle filter regeneration, a certain additional amount of fuel is consumed. The parameters for determining the second value are engine speed, an injection quantity and the charging pressure, so that, in an advantageous way, there is no need for additional sensors.

Furthermore, by taking into account the first value and the second value, an optimised nominal charging pressure value is set in accordance with the invention. Setting the nominal charging pressure value, more particularly, includes the determination of the value. In a preferred embodiment, the nominal charging pressure is optimised with a view to achieving a minimum fuel consumption. Furthermore, the nominal charging pressure value is preferably set or corrected while observing the emission value limits.

An advantage of the inventive method consists in that the optimised nominal charging pressure value, in addition to the fuel consumed under normal driving conditions, also takes into account the fuel required for a particle filter regeneration as fuel consumption, thus providing a consumption-optimised nominal charging pressure value for the entire system. The efficiency for the entire system thus increases in an advantageous way. A further advantage consists in that, as a result of the inventive method, the calibration parameter of the charging pressure becomes irrelevant, which leads to an important advantage in the calibration process. The inventive method makes it possible in an advantageous way to considerably reduce applications in the motor vehicle. Any corrections of the air parameters, for instance for barometric pressure and low temperatures, can be compensated for in an advantageous way. A reduction in fuel consumption when operating an internal combustion engine in motor vehicle traffic of up to two percent can be expected.

According to a preferred embodiment of the inventive method it is proposed that there are determined even further values for a charging pressure minimising fuel consumption, taking into account other influencing factors, wherein, taking into account all values or at least some of the values, the optimised nominal charging pressure value is set. For example, the inner efficiency constitutes an influencing factor which can be taken into account and which is dependent on the combustion air ratio.

According to a preferred embodiment of the inventive method it is proposed that, for the purpose of determining the second value, the soot emission of the internal combustion engine is quantified.

A first variant consists in that the soot emission is determined as a function of the charging pressure of a model. More particularly, the model is determined empirically. Alternatively, it is possible to use a physical model.

A second variant consists in that the soot emission is determined as a function of the charging pressure via a characteristic map.

A further object of the invention refers to an internal combustion engine with a particle filter for the treatment of exhaust gases, wherein a charging-pressure-guided control method, as described above, is used.

BRIEF DESCRIPTION OF THE DRAWINGS

Below, the invention will be described in greater detail with reference to diagrams. The descriptions apply to both the inventive method and to the inventive internal combustion engine.

DETAILED DESCRIPTION OF THE INVENTION

Figure 1:
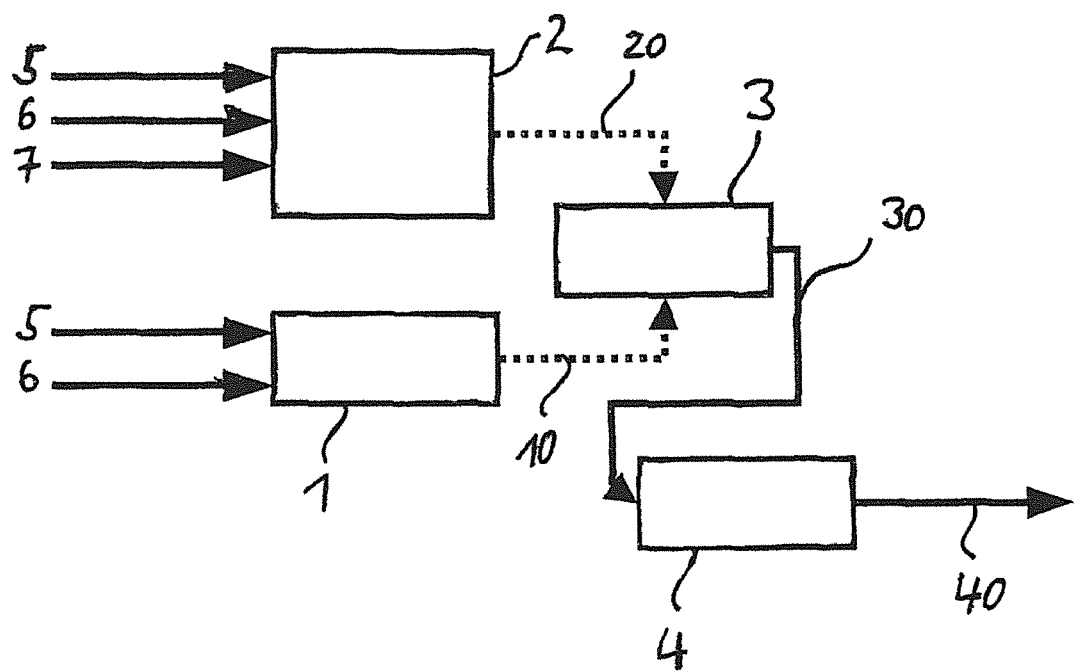
FIG. 1 is a diagram of an embodiment of the inventive method.

When controlling the masses of an air system it is very important to set the consumption-optimum nominal charging pressure value while observing emission value limits required by law. The nominal value for a charging-pressure-guided control method according to FIG. 1, also referred to as nominal charging pressure value 30, greatly influences the fuel consumption of an internal combustion engine. It influences same, on the one hand, directly via the efficiency in the combustion process and the charge exchange, and, on the other hand, indirectly via the particle emission by shortening or lengthening the regeneration interval. The inventive method therefore takes into account both influencing paths when calculating the nominal charging pressure value 30. The soot emission is preferably determined via a model 2 as a function of the charging pressure 7 while taking into account the engine speed 5 and the injection quantity 6. It is therefore advantageously possible to expect an additional consumption value as a result of the regeneration of the particle filter. The influence of the charge exchange and of the process efficiency in the high-pressure process on the fuel consumption is also determined as a function of operating parameters by prior art characteristic curves and/or characteristic maps comprising performance characteristics.

The first value 10 and the second value 20 for the charging pressure, which values were determined as a function of the different influences regarding a minimised fuel consumption, are processed in a subsequent optimisation process 3 in such a way that there is determined the nominal charging pressure value 30, which is consumption-optimum for the entire system. A subsequent limiting process 4 optionally determines a corrected nominal charging pressure value 40 which ensures that the emission value limits are observed.

Figure 2:
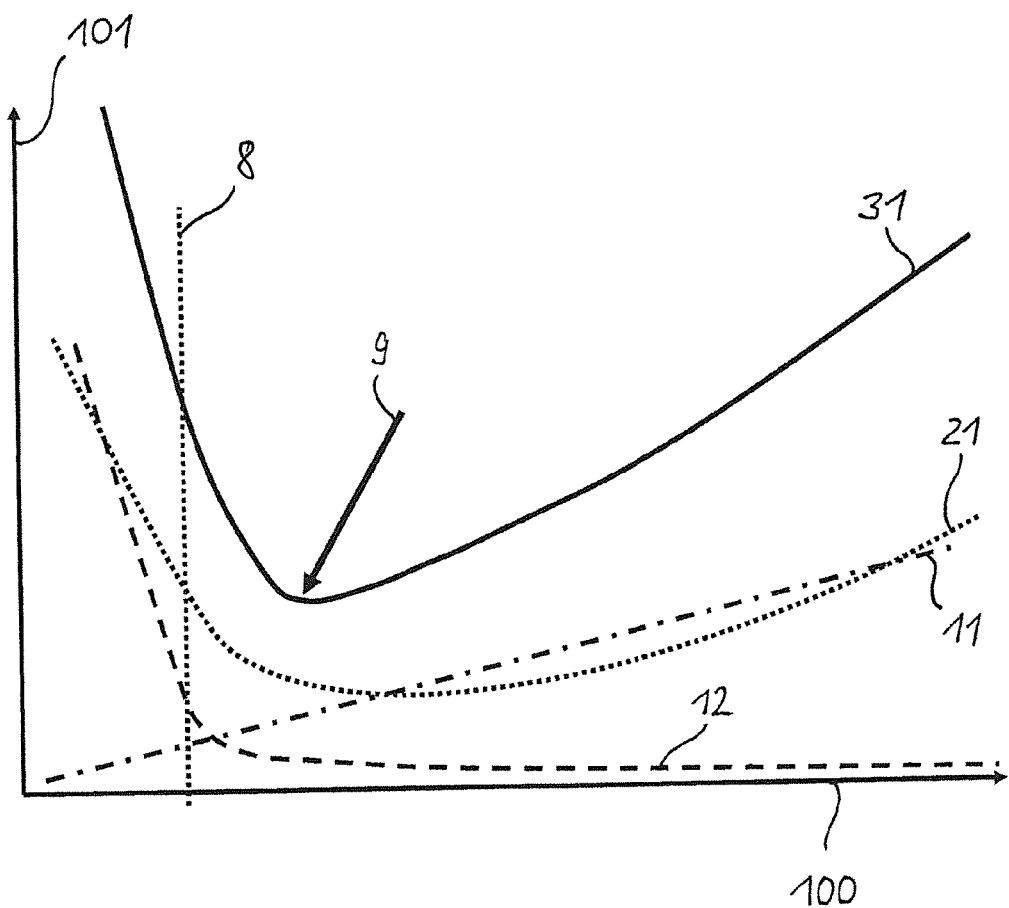
FIG. 2 is a diagram showing the influences of different parameters of fuel consumption.

FIG. 2 shows a diagram giving the specific fuel consumption on axis 101 as a function of the charging pressure gradient on axis 100, with the different curves 11, 12, 21 representing the fuel consumption based on certain influencing factors. The non-continuous line 8 indicates the charging pressure at which there would exist a stoichiometric fuel-air mixture, i.e. a lambda value of one.

Diesel engines, as a rule, operate in a leaner-than-stoichiometric range. The curve 11 indicates the fuel consumption which is influenced by the charge exchange. Curve 12 shows the influence of the charging pressure on the inner efficiency, i.e. the process efficiency of the high-pressure process. The influencing factors represented by curves 11, 12 are determined by the internal combustion engine alone. Curve 21 represents the indirect connection between the fuel consumption and the charging pressure due to the influence of the regeneration intervals of the particle filter. The values were determined empirically and form the basis of an empirical model for quantifying the soot emission. Finally, curve 31 combines all the influencing factors. It is the object of the inventive method to set the nominal charging pressure value to the minimum of curve 31 indicated by arrow 9.

An increase in charging pressure results in higher losses in the charge exchange or charging gas exchange, i.e. a higher fuel consumption, just like regeneration generates an increase in fuel consumption, the optimum being where the gradient of the specific fuel consumption equals zero, taking into account said increases in fuel consumption:

$$db_{eff}/dp_2 = db_{eff,GasExchang}/dp_2 + db_{eff,Reg}/dp_2 = 0,$$

with $b_{eff}$ being the specific fuel consumption, $b_{eff,GasExchang}$ being the specific increase in fuel consumption as a result of the charge exchange and $b_{eff,Reg}$ being the specific increase in fuel consumption caused by regeneration.

Figure 3:
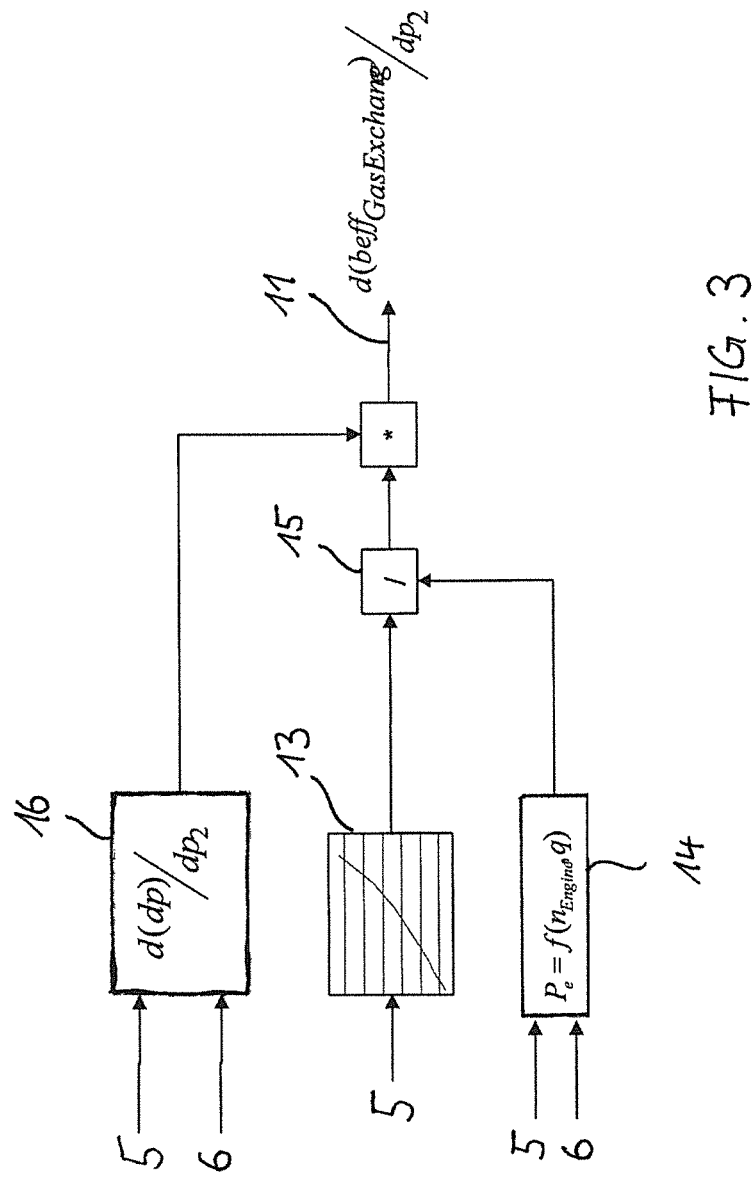
FIGS. 3 and 4 are diagrams explaining the consumption optimisation of the nominal value of the charging pressure according to FIG. 2.

The influence of the charge exchange according to curve 11 can be assumed to be constant; in FIG. 3 it is explained diagrammatically. The losses in the charge exchange 13 increasing with an increasing charging pressure depends on the speed 5 of the internal combustion engine and is related to a specific power 14 which is a function of the speed 5 and of the injection quantity 6; see block 15. Due to the changed rate 16 of the charging pressure, which also depends on the speed 5 and the injection quantity 6, there is obtained the specific increase in consumption due to the charge exchange, relative to the changed rate of the charging pressure, ($db_{eff,GasExchang}/dp_2$) according to curve 11 in FIG. 2.

Figure 4:
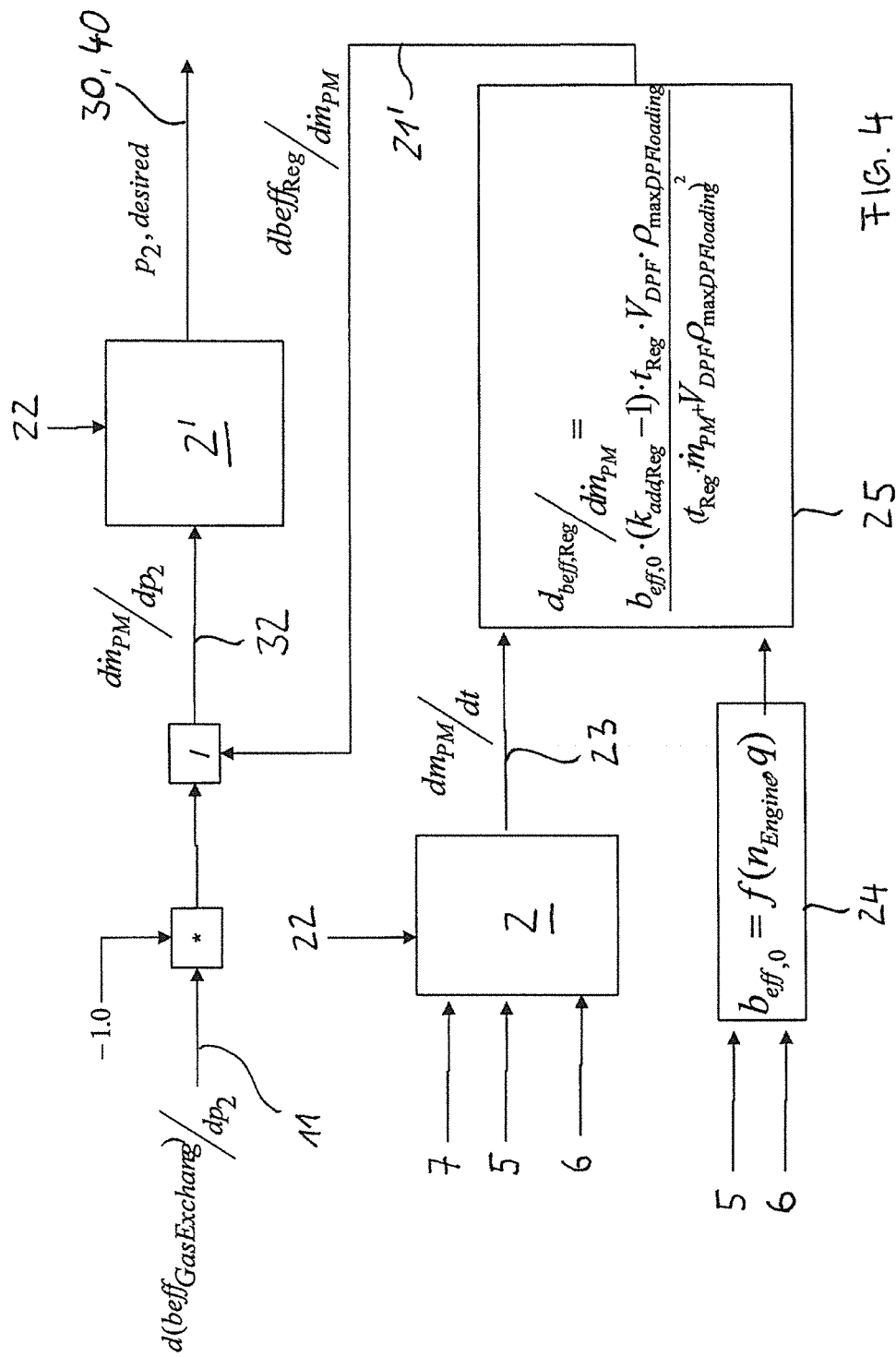

FIG. 4 shows a diagrammatic illustration of curve 21 in FIG. 2, as well as the optimising step towards the minimum point 9 of the resulting curve 31. Taking into account the input parameters of charging pressure 7, speed 5 and injection quantity 6, as well as an oxygen content 22 as a control variable, the soot model 2 provides a mass flow 23 of particle mass $m_{PM}$. Block 24 indicates a specific reference consumption $b_{eff,0}$ of the internal combustion engine as a function of the speed 5 and the injection quantity 6. The calculation in block 25

$$d_{beff,Reg}/d\dot{m}_{PM} = \frac{b_{eff,0} \cdot (k_{add,Reg} - 1) \cdot t_{Reg} \cdot V_{DPF} \cdot \rho_{max,DPF\ loading}}{(t_{Reg} \cdot \dot{m}_{PM} + V_{DPF} \cdot \rho_{max,DPF\ loading})^2}$$

giving the factor $k_{add,Reg}$ which indicates the ratio of the fuel consumption during regeneration to the fuel consumption without regeneration; the regeneration time $t_{Reg}$; the volume of the particle filter $V_{DPF}$ and the specific loading $\rho_{max,DPFloading}$ of the filter—provides the specific increase in consumption through regeneration, with reference to the mass flow of the particle mass (21'). By taking into account the mass flow of particles, there is thus obtained curve 21 in FIG. 2.

The specific increase in consumption due to charge exchange 11 according to FIG. 3 is now, with a negative sign, set into relation with the specific increase in consumption through regeneration, with reference to the mass flow of the particle mass (21'). In order to obtain from the resulting mass flow value 32 a nominal charging pressure value 30 and a corrected nominal charging pressure value 40, use is made of an inverted soot model 2'. As a result of the oxygen control 22, the nominal charging pressure value 30, 40 also corresponds to a nominal value for lambda.

The invention claimed is:

1. A method of controlling a charging pressure for an internal combustion engine having at least one of a particle filter and a nitrogen oxide catalyst for the treatment of exhaust gases, the method comprising:
    setting a nominal charging pressure of the internal engine as a function of operating parameters of the internal combustion engine;
    controlling the charging pressure of the internal combustion engine to achieve a nominal charging pressure value;
    determining a first value for the charging pressure that minimizes fuel consumption of the internal combustion engine by taking into account a direct influence of the charging pressure on the fuel consumption of the internal combustion engine;
    determining a second value for the charging pressure that minimizes the fuel consumption of the internal combustion engine by taking into account an indirect influence of the charging pressure on an interval-determined regeneration of the at least one particle filter and nitrogen oxide catalyst for the treatment of exhaust gases; and
    setting an optimized nominal charging pressure value by taking into account the first value for the charging pressure and the second value for the charging pressure.

2. A method according to claim 1, wherein the nominal charging pressure value is optimized with a view of achieving a minimum fuel consumption.

3. A method according to claim 1, wherein the nominal charging pressure value is set while observing emission value limits.

4. A method according to claim 1, wherein determining the second value of the charging pressure includes quantifying a soot emission of the internal combustion engine.

5. A method according to claim 4, wherein the soot emission is determined as a function of the charging pressure via a model.

6. A method according to claim 5, wherein the model is determined by empirical means.

7. A method according to claim 5, wherein use is made of a physical model for the soot emission.

8. A method according to claim 4, wherein the soot emission is determined as a function of the charging pressure via a characteristic map.

9. A method according to claim 1, further including determining the second value using at least one of the operating parameters selected from an engine speed, an injection quantity and a charging pressure.

10. A method according to claim 1, wherein the operating parameters for the internal combustion engine are selected from at least one of an engine speed, an injection quantity and a charging pressure.

* * * * *